United States Patent
Judkiewicz

(10) Patent No.: US 8,359,854 B1
(45) Date of Patent: Jan. 29, 2013

(54) METHOD OF TORQUE CONVERSION WITH CONSERVATION OF ENERGY (NO POWER LOSS)

(76) Inventor: Jaroslaw Judkiewicz, Kearny, NJ (US)

(*) Notice: Subject to any disclaimer, the term of this patent is extended or adjusted under 35 U.S.C. 154(b) by 841 days.

(21) Appl. No.: 12/925,989

(22) Filed: May 7, 2009

(51) Int. Cl.
*F16D 39/00* (2006.01)
(52) U.S. Cl. .......................... 60/492; 60/491
(58) Field of Classification Search ............ 60/487, 60/489, 491, 492
See application file for complete search history.

(56) References Cited

U.S. PATENT DOCUMENTS

| | | | | | |
|---|---|---|---|---|---|
| 2,355,780 | A | * | 8/1944 | Byrne | 60/489 |
| 3,740,954 | A | * | 6/1973 | Young | 60/489 |
| 4,598,546 | A | * | 7/1986 | Van Kanegan | 60/491 |
| 4,646,521 | A | * | 3/1987 | Snyder | 60/491 |
| 5,655,370 | A | * | 8/1997 | Folsom et al. | 60/491 |
| 5,904,043 | A | * | 5/1999 | Nagatomo | 60/435 |

* cited by examiner

*Primary Examiner* — Thomas E Lazo

(57) ABSTRACT

This is a project of mechanical machine, which allowed smoothly change rpm ratio between input and output with principle of conservation of energy (no loss of power) while changing the ratio.

1 Claim, 6 Drawing Sheets

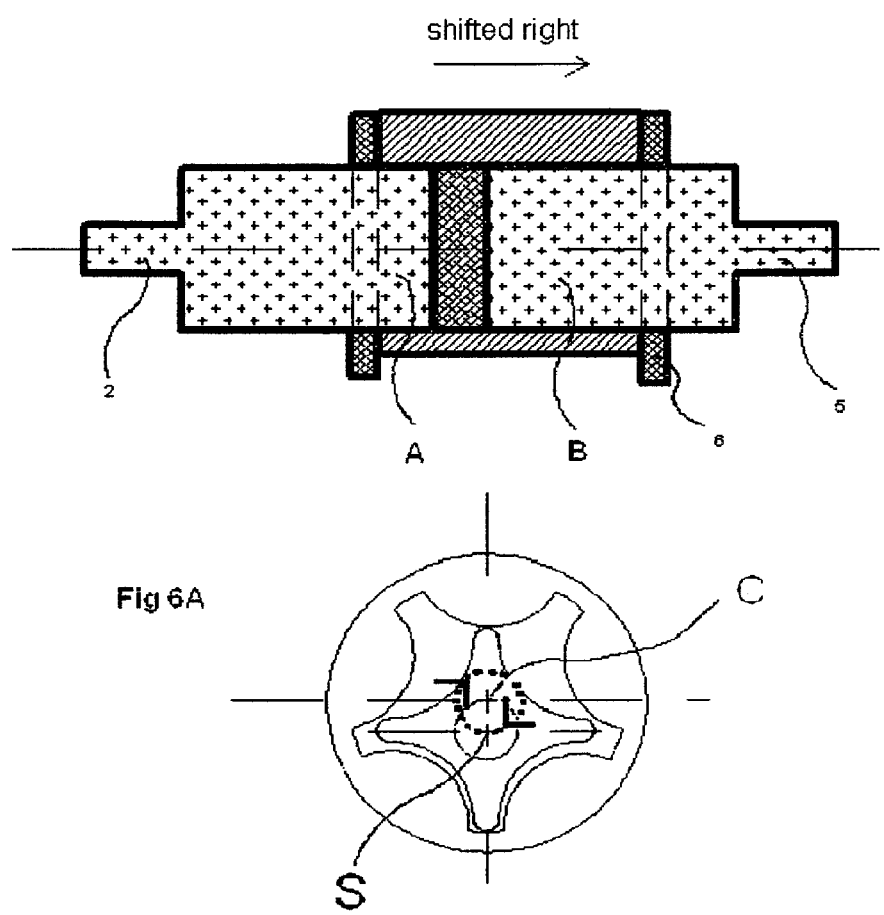

METHOD OF TORQUE CONVERSION WITH CONSERVATION OF ENERGY (NO POWER LOSS)

BACKGROUND OF THE INVENTION

This invention relates to the new and improved automatic transmission. The constant problem to create better transmission which allows for better matching between input rpm and output rpm and smoothly changing ratio between rpm's was addressed by many inventors with better or worse results. Most of these designs allow smoothly rpm change with significant power loss. In this design, I am trying to show the other solution with virtually no power loss. The only power loss will come out of imperfections of building moving parts and it could be in range of 1%.

DESCRIPTION OF PRIOR ART

Many mechanical machines are powered by, motors or engines and it was always problem of matching rpm's. In motor vehicles for example to do that task, transmission are used. These transmissions can not match perfectly engine to wheels due to the limited amount of gears they contain. There was always need to create an automatic transmission which allows smoothly change ratio between rpm's with no power loss.

This design try to solve this problem and allows smoothly change rpm's between input and output with no power loss.

OBJECT AND ADVANTAGES

Accordingly, two advantages of my invention are:
(a) To provide almost perfect match between engine and wheels.
(b) To provide cost saving production due to simplicity of design.

SUMMARY

In accordance with the present invention described here, torque converter comprise of housing divided into two chambers by divider 4, two independent rotors (2 and 5) and two seals (3 and 6) preventing liquid getting out of housing.

DRAWINGS

FIG. 1 is a view of the whole assembly.
FIG. 2 is same as FIG. 1, but with removed body 1.
FIG. 3 is a side view.
FIG. 3A is a view A of FIG. 3
FIG. 3B is a view A of FIG. 3 with removed part 6
FIG. 4 is a cross section of FIG. 3.
FIG. 5 is a cross section with body shifted to the left.
FIG. 5A shows direction in which S goes around C.
FIG. 6 is a cross section with body shifted to the right.
FIG. 6A shows direction in which S goes around C.

REFERENCE NUMERALS IN DRAWINGS

1 Body of the converter.
2 Rotor of the first pump.
3 Left wall, sealing body of the converter on the left side.
4 Divider divides body of converter to two chambers.
5 Rotor of the second pump.
6 Right wall, sealing body of the converter on the right side.

DETAILED DESCRIPTION

FIG. 2 shows the whole assembly of this unit with removed housing and contains: 1—body of the pump which is normally located between part 3 and part 6 (here removed for the reason to show how internal parts are aligned). 4—divider, which divide body 1 into two chambers or two pumps. 2—rotor of first pump, 5—rotor of second pump. 3 and 6—are two closing walls to prevent liquid escape from inside body 1.

FIG. 3 is a side view of assembly. FIG. 3A is a view A and FIG. 3B is a closer view A with part 6 removed to demonstrate location of shaft S of rotor 5 compare to the axle C of body 1.

FIG. 6 is a cross section of the whole assembly in FIG. 3 with body 1 shifted to the right. Chamber A has decreased volume and chamber B has increased volume.

FIG. 6A shows direction in which shaft S will run around axle C.

ADVANTAGES

From description above a great advantage—the simplicity of my converter become evident.

OPERATION

Figure 1:
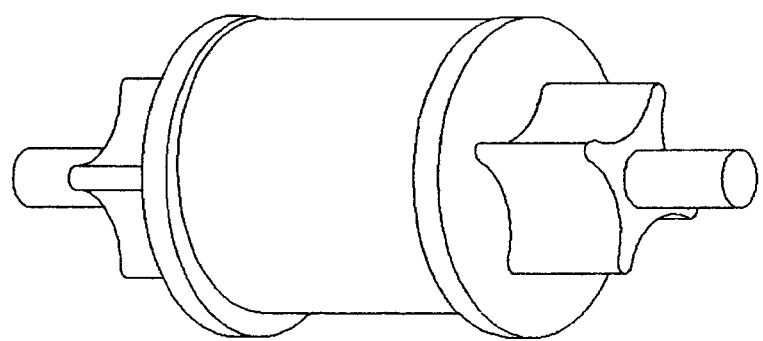
Figure 2:
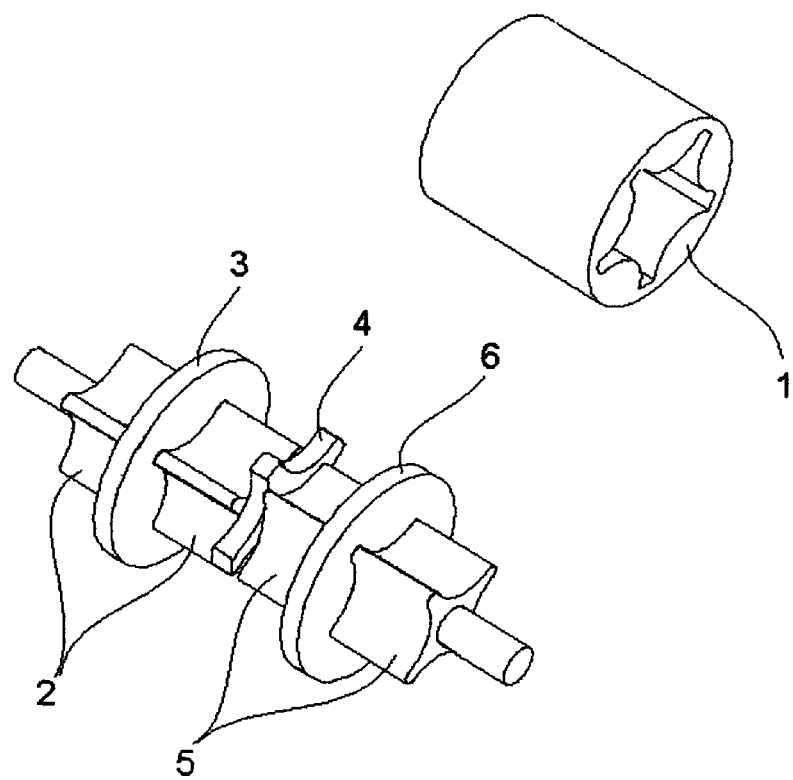
Figure 3:
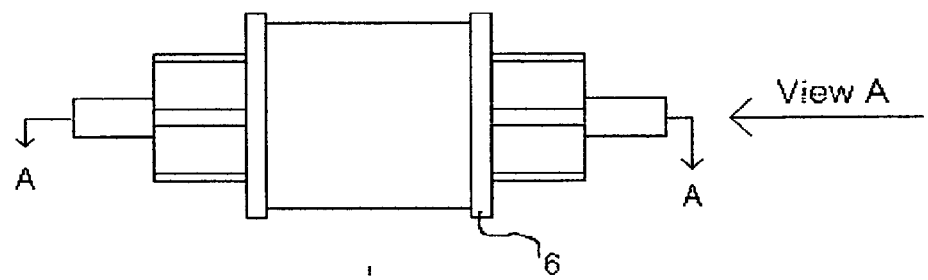
Figure 3A:
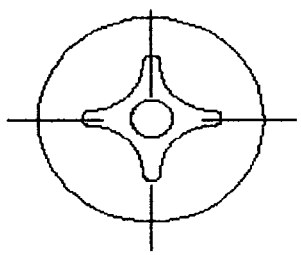
Figure 3B:
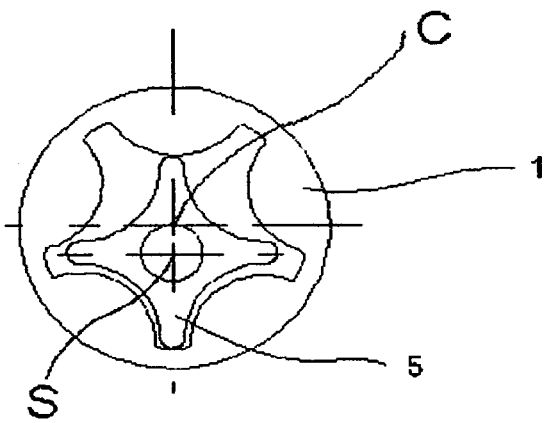
Figure 4:
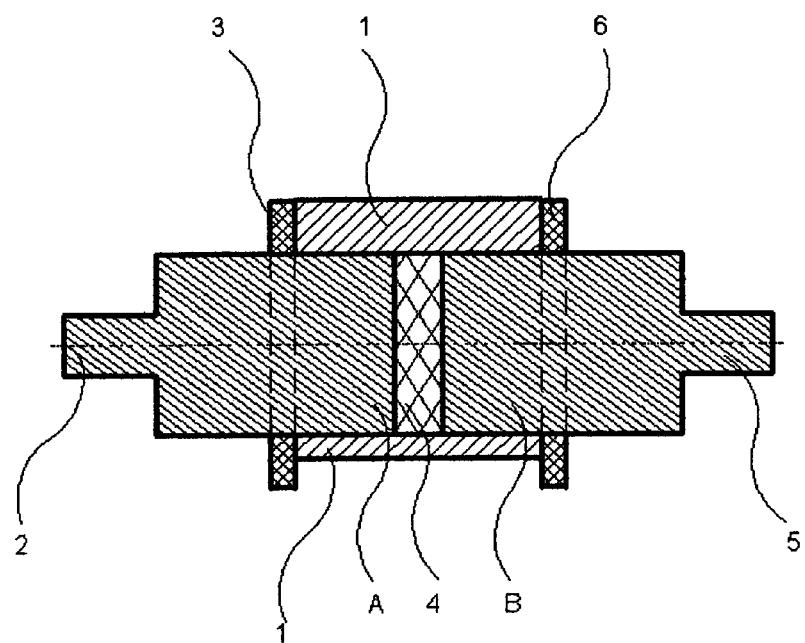
FIG. 4 is a cross section of the whole assembly in FIG. 3. Chambers A and B have the same volume.

FIG. 4 shows operation of my device. Lets assume that rotor 2 is connected to the engine and is turning with certain speed and divider 4 is located in the center of body 1, so volumes A and B are equal in size. Pump A (rotor 2) and pump B (rotor 5) are connected the way that all volume of liquid from chamber A is pumped to pump B and from pump B comes back to the pump A. If rotor 2 is turning with certain speed, then rotor 5 is turning with the same speed and location of shaft S compared to C is unchanged.

Figure 5:
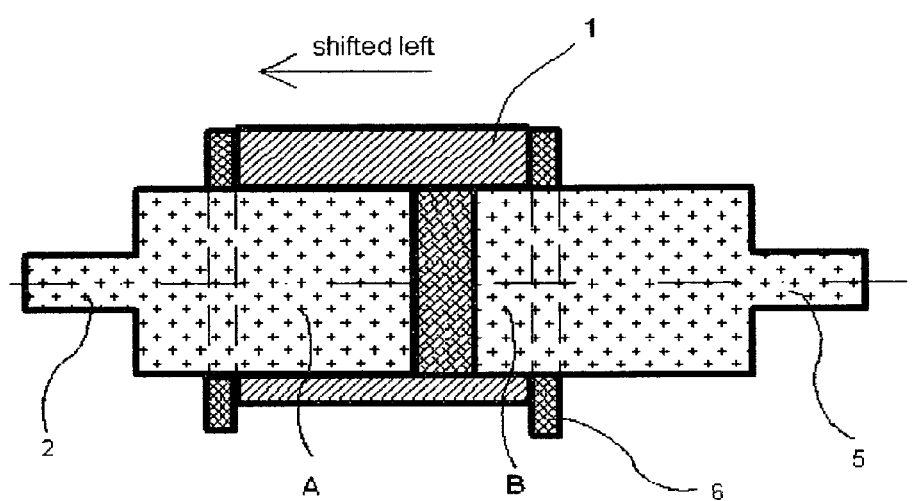
FIG. 5 is a cross section of the whole assembly in FIG. 3 with body 1 shifted to the left. Chamber A has increased volume and chamber B has decreased volume.
Figure 5A:
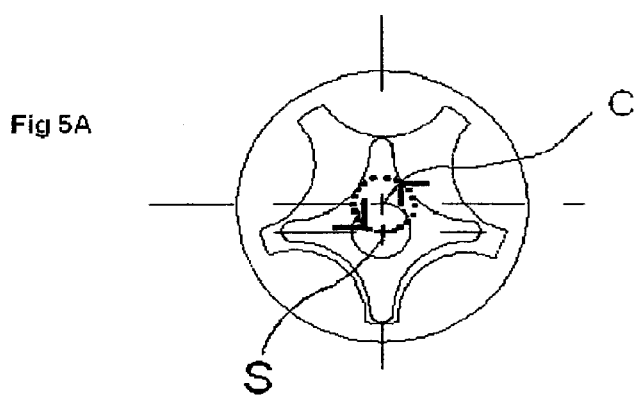
FIG. 5A shows direction in which shaft S will run around axle C.

In FIG. 5 body was shifted to the left, so chamber A increased volume and chamber B decreased volume. In this case pump A is pumping much more liquid, so rotor 5 of pump B must increase speed compare to rotor 2. The increased speed of rotor 5 will force shaft S of rotor 5 to run around axle C over dotted line as FIG. 5A shows.

In FIG. 6, the body was shifted to the right, so rotor 5 will decrease speed compare to rotor 2, because much less liquid is pumped. In this case FIG. 6A shows the exactly opposite direction of movement of S around C.

CONCLUSION, RAMIFICATION AND SCOPE

Thus the reader will see that my method of torque converter provides much better matching engine—wheels connection.

While my above description contains many specificities, these should not be construed as limitation on the scope of the invention, but rather as an exemplification of one preferred embodiment thereof. Many other variations are possible. For example, instead two pumps with common body, two pumps with common shaft and separate bodies could be used and output speed could be collected as differential speed between bodies of pumps.

Accordingly, the scope of the invention should be determinated not by embodiments illustrated, but by the appended claims and they legal equivalents.

The invention claimed is:

1. A method of torque conversion comprising the steps of:
providing two variable displacement pumps connected hydraulically such that all liquid pumped by the first pump is sent to the second pump and back creating a closed loop;
driving an output by rotation of the first pump;
driving the output by rotation of the second pump;
rotating the output at a speed equal to the differential speed of rotation between the first and second pumps; and
controlling the speed and direction of rotation of the output by varying the displacements of the first and second pumps.

* * * * *